(12) United States Patent
Shankara

(10) Patent No.: US 7,746,865 B2
(45) Date of Patent: Jun. 29, 2010

(54) MASKABLE CONTENT ADDRESSABLE MEMORY

(75) Inventor: Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 11/006,845

(22) Filed: Dec. 7, 2004

(65) Prior Publication Data

US 2006/0149853 A1 Jul. 6, 2006

(51) Int. Cl.
*H04L 12/28* (2006.01)
*H04L 12/56* (2006.01)
*G06F 15/173* (2006.01)
*G06F 15/16* (2006.01)

(52) U.S. Cl. .................. 370/393; 709/242; 709/245

(58) Field of Classification Search .................. 370/392
See application file for complete search history.

(56) References Cited

U.S. PATENT DOCUMENTS

| | | | | |
|---|---|---|---|---|
| 5,920,886 A * | 7/1999 | Feldmeier | .................... | 711/108 |
| 6,052,683 A * | 4/2000 | Irwin | .............................. | 707/8 |
| 6,237,061 B1 * | 5/2001 | Srinivasan et al. | .......... | 711/108 |
| 6,526,055 B1 * | 2/2003 | Chiu et al. | ................... | 370/392 |
| 6,665,297 B1 * | 12/2003 | Hariguchi et al. | ........... | 370/392 |
| 7,111,071 B1 * | 9/2006 | Hooper | ....................... | 709/238 |
| 7,289,502 B1 * | 10/2007 | Gemelli et al. | .............. | 370/392 |
| 7,292,569 B1 * | 11/2007 | Smith et al. | .................. | 370/383 |
| 7,519,733 B1 * | 4/2009 | Thubert et al. | ............... | 709/238 |
| 2003/0005210 A1 * | 1/2003 | Thummalapally et al. | ....... | 711/1 |
| 2003/0018927 A1 * | 1/2003 | Gadir et al. | .................... | 714/4 |
| 2004/0052251 A1 * | 3/2004 | Mehrotra et al. | ............. | 370/389 |
| 2004/1005225 * | 3/2004 | Mehrotra et al. | ............. | 370/389 |
| 2004/0230696 A1 * | 11/2004 | Barach et al. | ................ | 709/238 |
| 2005/0232264 A1 * | 10/2005 | Wybenga et al. | ............. | 370/389 |

FOREIGN PATENT DOCUMENTS

| CA | 2 265 302 A1 | 9/1999 |
|---|---|---|
| CA | 2265302 A1 | 9/1999 |
| WO | WO-00/24159 A2 | 4/2000 |
| WO | WO-2004/040400 A2 | 5/2004 |
| WO | WO-2006/063717 A1 | 6/2006 |

OTHER PUBLICATIONS

International Search Report and Written Opinion from PCT/US2005/044591, mailed May 19, 2006, 11 pgs.
Liu, Huan, "Routing Table Compaction in Ternary CAM," IEEE Micro, IEEE Service Center, Jan.-Feb. 2002, pp. 58-64, Los Alamitos, CA, U.S.
Kobayashi, Masayoshi, "A Longest Prefix Match Search Engine for Multi-Gigabit IP Processing," IEEE, Jun. 18-22, 2000, pp. 1360-1364, vol. 3 of 3, New York, NY, U.S.
Weight, Office Action, Apr. 20, 2009, 6 pages, Application No. 11 2005 002 981.6-31, German Patent and Trademark Office, Munich, Germany.
The First Office Action, PCT Application in the National Phase, Sep. 4, 2009, 16 pages, Shanghai Patent & Trademark Law Office, Beijing, China.

* cited by examiner

*Primary Examiner*—William Trost, IV
*Assistant Examiner*—Andrew Chriss
(74) *Attorney, Agent, or Firm*—Blakely, Sokoloff, Taylor & Zafman LLP

(57) ABSTRACT

A maskable content addressable memory may store one or more address prefixes. A port on which the packet may be sent is determined by comparing the destination address of a received packet by masking the address prefixes and the destination address.

18 Claims, 5 Drawing Sheets

MCAM 250

| ADDRESS PREFIX | PORT ID Mask Lc | PORT ID Mask Lb | PORT ID Mask La |
|---|---|---|---|
| 1011 1110 01* | 210-B | 210-C | 210-D |
| 1100 0000 11* | * | * | 210-A |
| 1101 1100 01* | * | * | 210-B |
| 1011 1101 10* | * | 210-D | 210-C |
| 110 * | 210-C | * | * |
| 10 * | 210-A | * | * |

MCAM 250

| ADDRESS PREFIX | PORT ID Mask Lc | PORT ID Mask Lb | PORT ID Mask La |
|---|---|---|---|
| 1011 1110 01* | 210-B | 210-C | 210-D |
| 1100 0000 11* | 210-C | * | 210-A |
| 1101 1100 01* | 210-C | * | 210-B |
| 1011 1101 10* | 210-C | 210-D | * |
| 10 * | 210-A | * | * |

MASKABLE CONTENT ADDRESSABLE MEMORY

BACKGROUND

A computer network generally refers to a group of interconnected wired and/or a wireless medium devices such as, for example, laptops, desktops, mobile phones, servers, fax machines, printers, etc. that may share resources. One or more intermediate devices such as switches and routers may be provisioned between end systems to support data transfer. Each intermediate device after receiving a packet may determine a port on which the packet may be sent onward. A content addressable memory (CAM) of the intermediate devices may determine the port.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a router comprising a Maskable Content Addressable Memory (MCAM). In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
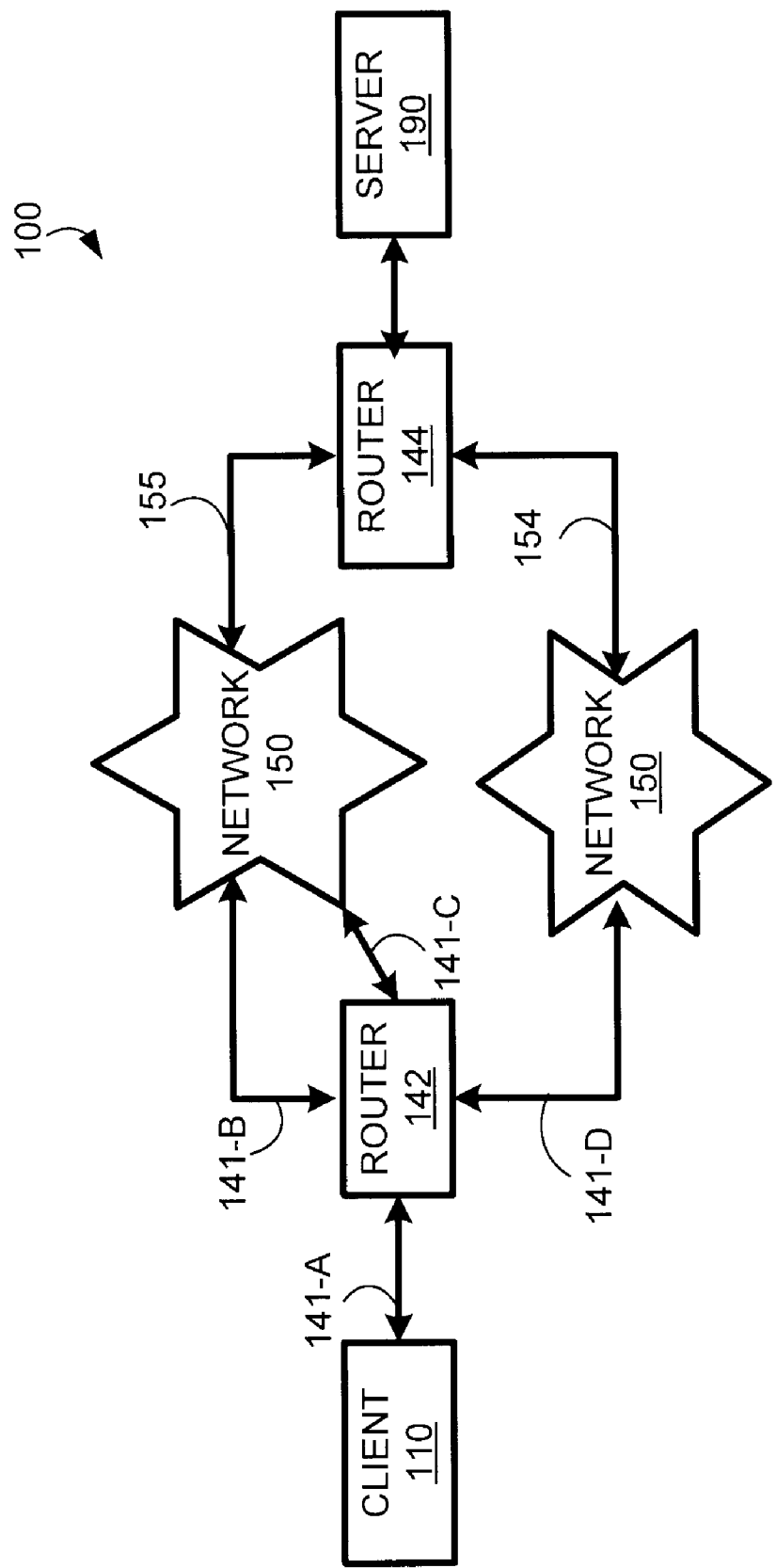
FIG. 1 illustrates an embodiment of a network environment.

An embodiment of a network environment 100 is illustrated in FIG. 1. The network environment 100 may comprise end devices such as a client 110 and a server 190, intermediate devices such as router 142 and router 144, and network 150. For illustration, the network environment 100 is shown with a small number of each type of device, however, a typical network environment may comprise a large number of each type of device.

The client 110 may comprise a computer system such as a desktop or a laptop computer system that comprises various hardware, software, and firmware components to generate and send/receive data packets to/from a destination system such as the server 190. The client 110 may be connected to an intermediate device such as the router 142 via a local area network (LAN) to send/receive packets. The client 110 may, for example, support protocols such as hyper text transfer protocol (HTTP), file transfer protocols (FTP), TCP/IP, etc.

The server 190 may comprise a computer system capable of sending/receiving packets to/from various clients such as the client 110. The server 190 may generate a packet in response to receiving a request from the client 110 and may then send the packet to the client 110. The server 190 may be coupled to the router 144 via another LAN. The server 190 may comprise a web server, transaction server, database server, etc.

The network 150 may comprise one or more intermediate devices such as switches and routers (not shown), which may receive, process, and send the packets to an appropriate intermediate device. The network 150 may enable end systems such as the client 110 and the server 190 to transmit/receive data. The intermediate devices of the network 150 may be configured to support various protocols such as TCP/IP.

The routers 142, 144 may enable one end system to receive/send packets to/from another end system. For example, the router 142 after receiving a packet from the client 110 may determine the next router provisioned in the path and may forward the packet to the next router. Also, a packet received from the network 150 may be forwarded to the client 110. The router 142 may determine the next router based on routing table entries which may comprise an address prefix and port identifiers.

Figure 2:
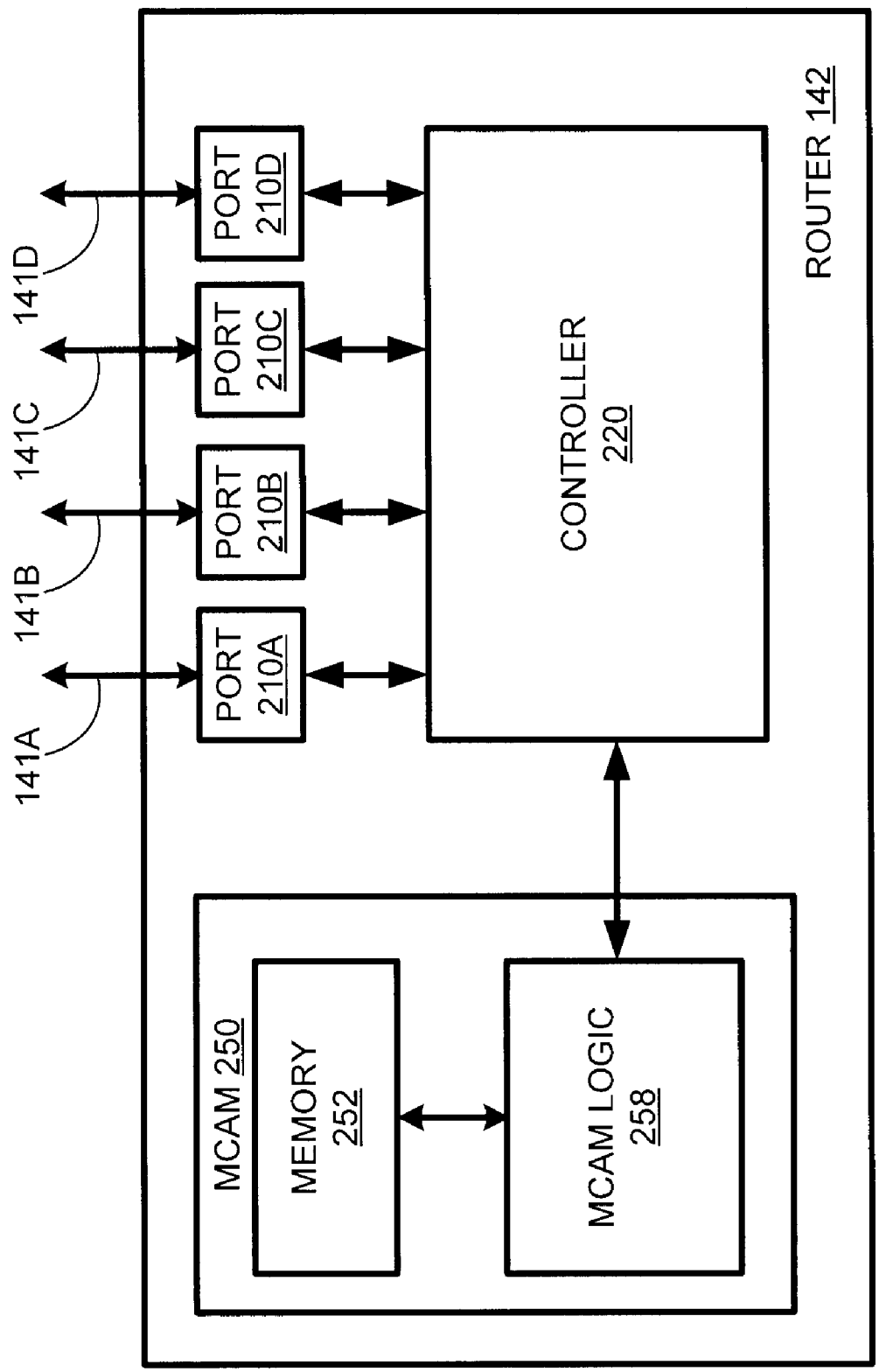
FIG. 2 illustrates an embodiment of a router of the network environment of FIG. 1 that has a Maskable Content Addressable Memory (MCAM).

An embodiment of the router 142 is illustrated in FIG. 2. The router 142 may comprise ports 210-A through 210-D, a controller 220, and a Maskable Content Addressable Memory (MCAM) 250. Other routers of the network environment 100 such as the router 144 may also be implemented in a similar manner. The ports 210-A through 210-D may provide physical, electrical, and protocol interfaces to send/receive packets to/from an adjacent intermediate device or an end system. In one embodiment, each port 210 is identified by a port identifier that enables the router 142 to identify the ports 210 and to send a packet on a specific identified port. For example, a packet from the client 110 may be received via port 210-A coupled to path 141-A, and after processing, the router 142 may determine to send the packet via port 210-D. Further, the router 142 may receive a packet via port 210-D and may send the packet on an appropriate port after processing the packet.

The controller 220 may receive a packet via one of the ports 210, extract a destination address from the packet, and then provide the destination address to the MCAM 250. In response, the controller 220 may receive a port identifier on which the packet may be sent onward or a signal indicating a match not found. The controller 220 after receiving the port identifier may cause the packet to be forwarded on the path coupled to the port identified by received port identifier. On receiving a match not found signal, the controller 220 may discard the packet as undeliverable and may send a message such as an Internet Control Message Protocol (ICMP) notification to the sending device. Continuing with the above example, the controller 220 may extract the destination address from the packet received on the port 210-A, may send the destination address to the MCAM 250, may receive a port identifier corresponding to port 210-D, and may cause the packet to be forwarded on path 141-D via port 210-D.

The controller 220 may construct a routing table comprising address prefixes and corresponding port identifiers based on routing protocols such as distance vector protocols (e.g., Routing Information Protocol (RIP)), or link state routing algorithms (e.g., Open Shortest Path First (OSPF)) and routing table entries received from adjacent routers. The controller 220 may provide a set of address prefixes and corresponding port identifiers to the MCAM 250. The controller 220 may dynamically update any changes in the address prefixes and the port identifiers based on various metrics such as distance, bandwidth etc.

In one embodiment, the MCAM 250 may be implemented as a hardware component to quickly determine the port on which an incoming packet may be forwarded onward. The address prefixes and corresponding port identifiers may be periodically updated based on the routing information provided by the controller 220. To this end, the MCAM 250 may comprise a memory 252 to store address prefixes and a MCAM logic 258 to determine the port identifier on which an incoming packet may be sent onwards.

The memory 258 may comprise one or more memory locations to store the set of address prefixes and corresponding port identifiers. In one embodiment, the memory 252 may comprise ternary storage elements each capable of storing a zero, one, or don't care bit (0, 1, *). However, the memory 252 in other embodiments may comprise pairs of binary storage elements to implement the don't care state. In yet other embodiments, the memory 252 may comprise binary storage elements without tracking don't care states. In such an embodiment, the address prefixes may be complete network addresses and masks (described below) may be used to associate multiple network addresses with a single port. In other words, a network segment comprising two or more network addresses may be represented by a single address prefix associated with a single port by using a mask of appropriate length. A network segment, for example, may comprise 256 network addresses 192.168.1.0 to 192.168.1.255 associated with a single port 210-C. By masking, 256 network addresses may be represented by a single network address, for example, 192.168.1.1 associated with port 210-C corresponding respectively to a 32 bit mask and 24 bit mask. It may be appreciated that 256 addresses which may need (256×32+ 256×3=) 8960 bits may thus, be stored using (1×32+2×3=) 39 bits in memory 252.

The MCAM logic 258 may receive, for example, a new address prefix and an associated port identifier and may determine whether the new address prefix is to be stored or discarded. The new address prefix may be discarded if the new address prefix is absorbable by at least one address prefix of the address prefixes already stored in the memory 252. The MCAM logic 258 may discard the new address prefix if the new address prefix is absorbable and the corresponding port identifier may be stored in the memory 252. The port identifier of the new address prefix (absorbed address prefix) may be associated with the address prefix (absorbing address prefix) that absorbs the new address prefix. The MCAM logic 258 may cause the new address prefix and the associated port identifier to be stored in the memory 252 if the new address prefix is not absorbable by any of the address prefixes already stored in the memory 252.

For example, the memory 252 may comprise ten address prefixes; the MCAM logic 258 after receiving an eleventh address prefix may determine whether the eleventh address prefix is absorbable by at least one address prefix of the ten address prefixes. If a portion of an eleventh address prefix is a bit-wise match of a corresponding portion of a fifth address prefix, then the eleventh address prefix may be absorbed by the fifth address prefix. The portions of the address prefixes to be bit-wised matched may be based upon one or more masks of different mask lengths. In one embodiment, a four bit mask may be used to bit-wise match or compare the four most significant bits of a new address prefix with the four most significant bits of one or more address prefixes of the MCAM 250. As a result one address prefix may be associated with one or more port identifiers. As may be readily appreciated, the memory 252 may now comprise only ten addresses as the eleventh address prefix is discarded and absorbed by one of the ten address prefixes of the MCAM 250.

In one embodiment, each address prefix stored in the memory 252 may equal a length of 32 bits as in IPV4 (Internet Protocol Version 4) addressing scheme and the router 142 may comprise 8 ports. A memory space of 32 bits may be saved by discarding an absorbed address prefix (eleventh address prefix in the above example) and storing the corresponding port identifier with an absorbing address prefix (fifth address prefix in the above example). However, in a system using 3 mask lengths and having 8 ports, 3 bits may be utilized to save the port identifier associated with each mask length. Thus, in case of IPV4, a memory space of 26 bits ((32 bit address+3 bits)−(3 mask lengths*3 bits per mask length)) may be saved for each absorbed address prefix, and in the case of IPV6, a memory space of 119 bits ((128 bit address+3 bits)−(3 mask lengths*3 bits per mask length)) may be saved for each discarded (or absorbed) address prefix.

In one embodiment, the MCAM logic 258 may perform a longest match search of the address prefixes. To this end, the MCAM logic 258 may receive a destination address from the controller 220, may mask the address prefixes stored in the memory 252 with a corresponding mask, and may then determine whether the destination address matches any of the masked address prefixes. The portion of the destination address to be compared may be selected based on the mask length being used. If more than one masked address prefix matches the destination address, the MCAM logic 258 may select the longest matching address prefix. The MCAM logic 258 may provide the controller 220 with the port identifier corresponding to the selected address prefix and the used mask.

The MCAM logic 258 may generate a mask set S=(A, B . . . N) and the length of masks A, B . . . N may respectively equal La, Lb, . . . Ln. The length La may equal a longest length and Ln may equal a shortest length. In one embodiment, the MCAM logic 258 may determine the number of masks and the corresponding lengths based on statistics of stored address prefixes which may be determined periodically. The MCAM logic 258 may first mask each address prefix stored in the memory 252 with a mask of the longest length La, may search for matching address prefixes, and then may determine the longest matching address prefix.

In one embodiment, the longest length (La) may equal 32 bits, Lb may equal 8 bits, and Lc may equal 4 bits. The MCAM logic 258 may first mask the address prefixes with a mask equaling a length of 32 bits, may compare 32 bits of the destination address with corresponding bits in each address prefix, may determine the matching address prefixes, and then may determine the longest matching address prefix. The port identifier associated with the longest matching address prefix corresponding to mask of length La may be provided to the controller 220, if the length of the longest matching address prefix is greater than Lb. The MCAM logic 258 may continue to search a longest matching address prefix by iteratively masking the address prefixes in the decreasing order of the length of masks until all the masks of the mask set S is exhausted or until a satisfactory match is determined to have occurred.

To further reduce the memory space to store address prefixes, the MCAM logic 258 may identify the address prefixes equaling a length M which may be less than the length of one of the masks and may expand such address prefixes into multiple longer address prefixes by replacing don't care bits with appropriate zeros and/or ones. For example, an address prefix of 110* may be expanded to equal 1100* and 1101* ('*' represents don't care bits) such that the length of the expanded address prefixes may equal the length of the closest mask. The expanded address prefixes may be discarded if the expanded address prefixes may be absorbed by one or more address prefixes and the corresponding port identifier may be stored associated with a longest absorbing address prefix. Such an approach of expanding, absorbing, discarding the expanded address prefix if absorbable may further reduce the size of the memory 252.

Figure 3:
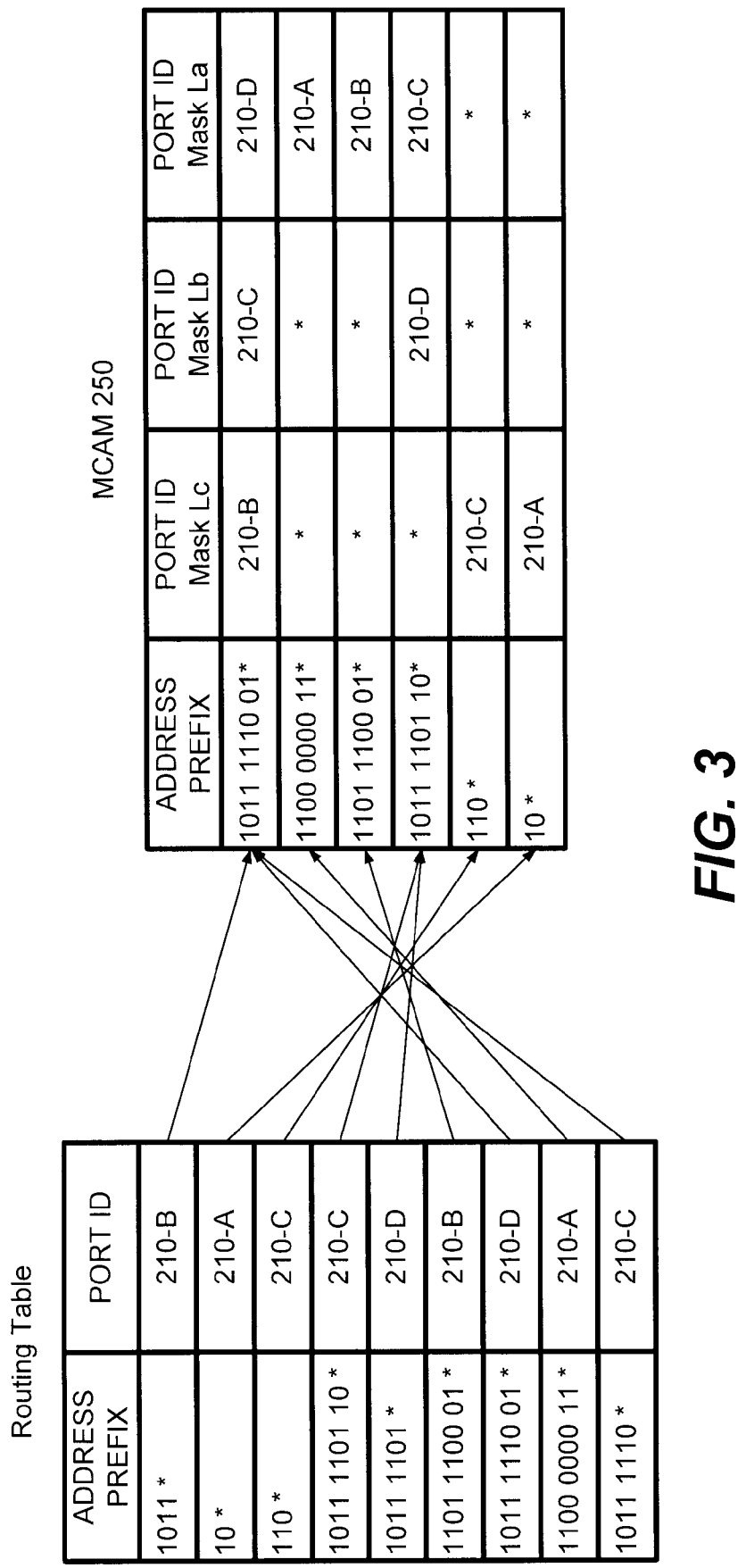
FIG. 3 illustrates an embodiment of storing address prefixes in the MCAM of FIG. 2.

FIG. 3 illustrates a sample routing table and one manner of storing the sample routing table in the MCAM 250. In the illustrated example, the MCAM 250 supports 3 masks (La, Lb, Lc) respectively of length 32 bits (e.g. FFFF_FFFFh), 8 bits (e.g. FF00_0000h), and 4 bits (e.g. F000_0000h). In other embodiments, the MCAM 250 may support a different number of masks and may support masks of different and/or dynamically configurable lengths. As illustrated, address prefix 1011* and address prefix 1011 1110* of the sample routing table are absorbed by the longer address prefix 1011 1110 01* of the MCAM 250. In particular, address prefix 1011* matches the longer address prefix 1011 1110 01* with mask Lc of 4 bits and address prefix 1011 1110* matches the longer address prefix 1011 1110 01* with mask Lb of 8 bits. Accordingly, the port identifiers of address prefix 1011 1110* and 1011* are respectively stored in the mask entries Lb and Lc of the address prefix 1011 1110 01*. A port identifier corresponding to an absorbed address prefix of length X may be stored associated with an absorbing address prefix corresponding to a mask of length closest to X. For example, the port identifier 210-B corresponding to the absorbed address prefix 1011* may be associated with longer address prefix 1011 1110 01* corresponding to a mask of length Lc (=4), which is closest to the length of 1011*. Similarly, a port identifier associated with an address prefix 1011 11* (not shown) after expanding (described below) may be associated with one or more absorbing address prefixes corresponding to a mask of length Lb, as the mask of length Lb (=8) is the closest mask and the length is equal to or greater than the length of the address prefix 1011 11*. However, a port identifier (e.g., 210-A) corresponding to an unabsorbed prefix (e.g., 10*) may be stored corresponding to a mask of closest length (=4) that is equal to or greater than the length of the unabsorbed address prefix.

Similarly, address prefix 1011 1101* of the sample routing table is absorbed by the longer address prefix 1011 1101 10* of the MCAM 250. In particular, address prefix 1011 1101* matches the longer address prefix 1011 1101 10* with mask Lb of 8 bits. Accordingly, the port identifier of address prefix 1011 1101* is stored in the mask entry Lb of the address prefix 1011 1101 10*.

Figure 4:
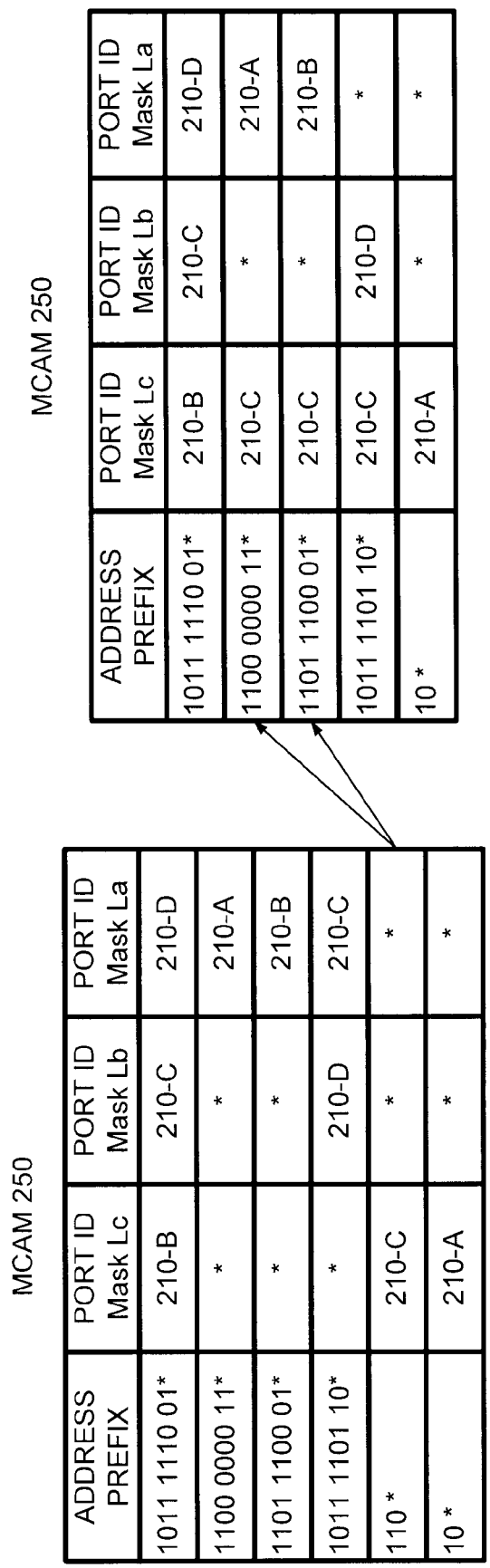
FIG. 4 illustrates an embodiment of storing address prefixes in the MCAM of FIG. 2.

FIG. 4 illustrates how entries of the MCAM 250 illustrated in FIG. 3 may be further absorbed or reduced. The MCAM logic 258 may expand one or more address prefixes into multiple address prefixes by replacing don't care bits with appropriate zeros and/or ones. The expansion may be performed to expand the length of the address prefix such that the length of the expanded address prefixes equals the length of the next closest mask. For example, the address prefix 110* may be expanded as 1100* and 1101* to obtain address prefixes having lengths equal to the next closest mask Lc of four bits.

The expanded address prefix 1100* of the sample routing table may be absorbed by the longer address prefix 1100 0000 11* of the MCAM 250. Similarly, the expanded address prefix 1101* may be absorbed by the longer address prefix 1101 1100 01*. As a result, the port identifier 210-C of original address prefix 110* may be stored in the mask entry Lc of both the address prefix 1100 0000 11* and the address prefix 1101 1100 01*.

As it may be readily appreciated, by discarding address prefix 110* and storing only the corresponding port identifier 210-C, the memory 252 may conserve memory space. Further, using more masks may enable more address prefixes to be absorbed by other address prefixes, thus, the address prefixes may be compactly stored.

Figure 5:
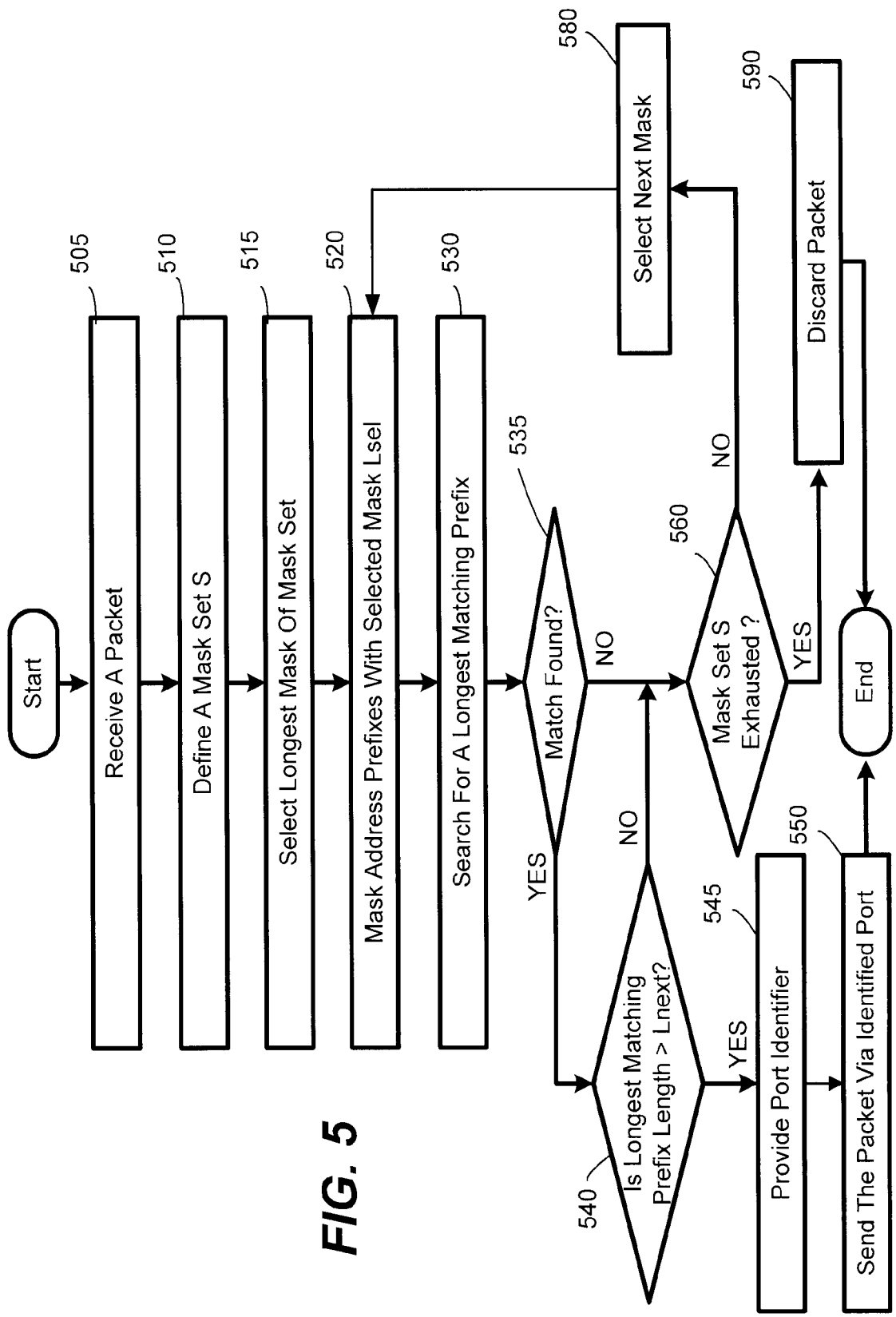
FIG. 5 illustrates routing a packet via an embodiment of the router depicted in FIG. 2.

FIG. 5 illustrates the search operation of an embodiment of the router 142 depicted in FIG. 2. In block 505, the router 142 may receive a packet. For example, the router 142 may receive a packet from the client 110 via port 210-A and the controller 220 may then extract the destination address from the packet. The controller 220 may provide the destination address to the MCAM 250.

In block 510, the MCAM logic 258 may define a mask set S comprising one or more masks that are ordered from the longest to the shortest masks. The number of masks may be determined dynamically based on configured values, statistics of routing table entries etc. In block 515, the MCAM logic 258 may select the longest mask from the mask set S. In one embodiment, the length of the longest mask may equal the length of the destination address. In the case of IPV4 addressing scheme, the length of the longest mask may equal 32 bits.

In block 520, MCAM logic 258 may mask the address prefixes stored in the memory 252 with the selected mask Lsel. In one embodiment, the selected mask Lsel may comprise a 32 bit mask (e.g. FFFF_FFFFh) that results in all 32 bits of the address prefixes being compared with the 32 bits of a IPv4 destination address. In block 530, the MCAM logic

258 may search for the longest masked address prefix that matches the masked destination address. In particular, the MCAM logic 258 may bit-wise compare the masked destination address with the masked address prefixes and may select the longest matching address prefix. In one embodiment, the address prefixes are stored in a sorted order with the longest address prefixes on top. Accordingly, if more than one entry matches, the MCAM logic 258 may select the top most matching address prefix as the longest address prefix. In block 535, the MCAM logic 258 may determine whether a match was found.

In response to determining that a match was found, the MCAM logic 258 in block 540 may determine whether the length of the longest matching address prefix is greater than the length of the next mask Lnext. In one embodiment, if the current mask is the last mask of the mask set S, then the MCAM logic 258 determines that the length of the longest matching address prefix is greater than the length of the next mask Lnext. In response to determining that the length of the longest matching address prefix is greater than the length of the next mask Lnext, the MCAM logic 258 in block 545 may provide the controller 220 with the port identifier stored in the appropriate mask entry of the longest matching address prefix. The controller 220 may then forward the packet onward via a port identified by the port identifier provided by MCAM 250 (block 550).

In response to determining that no match was found in block 535, the MCAM logic 258 may determine in block 560 whether the MCAM logic 258 has exhausted all the masks of the mask set S (block 580). In one embodiment, the MCAM logic 258 may determine that the mask set S is exhausted if the current mask is the shortest mask of the mask set S.

After determining that the mask set S is not exhausted, the MCAM logic 258 may select the next mask of the mask set S. For example, in one embodiment, the MCAM logic 258 may select the second longest mask Lb of 8 bits after having used the longest mask La of 32 bits. The MCAM logic 258 may then return to block 520 in order to search for the longest matching address prefix using the newly selected mask.

On the other hand if the mask set S is exhausted, the MCAM logic 258 may inform the controller 220 in block 590 that no match was found. The controller 220 may then discard the received packet and may send an ICMP message to the device or end system that sent the packet to indicate a failure in sending the packet.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a router comprising:
    generating a first address prefix and a second address prefix by masking the first address prefix with a first mask and the second address prefix with a second mask in response to receiving a first new address with a first port identifier and a second new address with a second port identifier,
    discarding the first address prefix and the second address prefix if the first address prefix and the second address prefix are absorbable by a third address prefix, wherein the third address prefix is stored in a content addressable memory prior to receiving the first new address and the second new address,
    storing the first port identifier and the second port identifier with the third address prefix in addition to a third port identifier stored with the third address prefix prior to receiving the first new address and the second new address,
    extracting a destination address from a received data unit,
    generating a first masked destination address by masking the destination address using a third mask,
    sending the data unit to a third port identified by the third port identifier if the first masked destination address matches with at least a first portion of the third address prefix, wherein the length of the first portion is at least greater than a length of a second mask and less than the length of the third mask.

2. The method of claim 1 comprises,
    generating a second masked destination address by masking the destination address using a second mask if the first masked destination address does not match with at least the first portion of the third address prefix, and
    sending the data unit to a second port identified by the second port identifier if the second masked destination address matches with at least a second portion the third address prefix, wherein the length of the second portion of the third address prefix is at least greater than a length of a first mask and less than the length of the third and the second mask.

3. The method of claim 1 comprises,
    generating a third masked destination address by masking the destination address using a first mask if the second masked destination address does not match with at least the second portion of the third address prefix, and
    sending the data unit to a first port identified by the first port identifier if the third masked destination address matches with a third portion of the third address prefix, wherein the length of the third portion is equal to the length of the first mask.

4. The method of claim 1 further comprises,
    receiving a fourth new address and a fourth port identifier,
    determining if the fourth new address is absorbable by at least one of a plurality of address prefixes stored in the content addressable memory, and
    storing a fourth address prefix and a fourth port identifier in the content addressable memory, wherein the fourth address prefix represents the fourth new address.

5. The method of claim 4, wherein the first address prefix is the longest matching address prefix.

6. The method of claim 4, wherein the plurality of address prefixes are stored in a sorted order starting from the longest matching address prefix.

7. The method of claim 6 comprises storing the first address prefix in the first address location within the content addressable memory.

8. The method of claim 1, wherein the third address prefix represents the first address prefix and the second address prefix by storing the first port identifier and the second port identifier along with the third address prefix.

9. The method of claim 1 further comprises
    generating a fifth address prefix and a sixth address prefix by padding don't care bits to the fourth address prefix until the length of the fifth address prefix and the sixth address prefix equals a mask length that is closest to the length of the fourth address prefix,
    comparing the fifth address prefix and the sixth address prefix with the plurality of address prefixes,
    discarding the fifth address prefix if the fifth address prefix matches with at least a portion of one of the plurality of address prefixes, and storing the sixth address prefix if the sixth address prefix does not match with any of the plurality of address prefixes.

10. An apparatus comprising:

a plurality of ports comprising a first, second, and a third port a controller coupled to the plurality of ports, wherein the controller is to extract a destination address from a data unit received over the first port, and a maskable content addressable memory coupled to the controller, wherein the maskable content addressable memory further comprises a maskable content addressable memory (MCAM) logic and a memory, wherein the MCAM logic is to, generate a first address prefix and a second address prefix by masking the first address prefix with a first mask and the second address prefix with a second mask in response to receiving a first new address with a first port identifier and a second new address with a second port identifier, discard the first address prefix and the second address prefix if the first address prefix and the second address prefix are absorbable by a third address prefix, wherein the third address prefix is stored in a content addressable memory prior to receiving the first new address and the second new address, store in the memory the first port identifier and the second port identifier with the third address prefix in addition to a third port identifier stored with the third address prefix prior to receiving the first new address and the second new address, extract a destination address from a received data unit, generate a first masked destination address by masking the destination address using a third mask, and send the data unit to a third port identified by the third port identifier if the first masked destination address matches with at least a first portion of the third address prefix, wherein the length of the first portion is at least greater than a length of a second mask and less than the length of the third mask.

11. The apparatus of claim 10, wherein the MCAM logic is to generate a second masked destination address by masking the destination address using a second mask if the first masked destination address does not match with at least the first portion of the third address prefix, and send the data unit to a second port identified by the second port identifier if the second masked destination address matches with at least a second portion the third address prefix, wherein the length of the second portion of the third address prefix is at least greater than a length of a first mask and less than the length of the third and the second mask.

12. The apparatus of claim 10, wherein the MCAM logic is to, generate a third masked destination address by masking the destination address using a first mask if the second masked destination address does not match with at least the second portion of the third address prefix, and send the data unit to a first port identified by the first port identifier if the third masked destination address matches with a third portion of the third address prefix, wherein the length of the third portion is equal to the length of the first mask.

13. The apparatus of claim 10, wherein the MCAM logic is to, receive a fourth new address and a fourth port identifier, determine if the fourth new address is absorbable by at least one of a plurality of address prefixes stored in the content addressable memory, and store a fourth address prefix and a fourth port identifier in the content addressable memory, wherein the fourth address prefix represents the fourth new address.

14. The apparatus of claim 13, wherein the first address prefix is the longest matching address prefix.

15. The apparatus of claim 13, wherein the plurality of address prefixes are stored in a sorted order starting from the longest matching address prefix.

16. The apparatus of claim 10, wherein the MCAM logic is to store the first address prefix in the first address location within the content addressable memory.

17. The apparatus of claim 10, wherein the third address prefix represents the first address prefix and the second address prefix by storing the first port identifier and the second port identifier along with the third address prefix.

18. The apparatus of claim 10, wherein the MCAM logic is to, generate a fifth address prefix and a sixth address prefix by padding don't care bits to the fourth address prefix until the length of the fifth address prefix and the sixth address prefix equals a mask length that is closest to the length of the fourth address prefix, comparing the fifth address prefix and the sixth address prefix with the plurality of address prefixes, discard the fifth address prefix if the fifth address prefix matches with at least a portion of one of the plurality of address prefixes, and storing the sixth address prefix if the sixth address prefix does not match with any of the plurality of address prefixes.

* * * * *